United States Patent
Dietl et al.

(10) Patent No.: US 8,841,576 B2
(45) Date of Patent: Sep. 23, 2014

(54) METHOD AND DEVICE FOR PRODUCING A METAL SHEET WITH A WELDED-ON PIPE

(75) Inventors: Michael Dietl, Spital am Pyhrn (AT); Arnold Teufel, Oberndorf (AT)

(73) Assignee: DTEC GmbH, Spital am Pyhrn (AT)

( * ) Notice: Subject to any disclaimer, the term of this patent is extended or adjusted under 35 U.S.C. 154(b) by 233 days.

(21) Appl. No.: 13/094,323

(22) Filed: Apr. 26, 2011

(65) Prior Publication Data

US 2011/0259859 A1 Oct. 27, 2011

(30) Foreign Application Priority Data

Apr. 27, 2010 (AT) .................................. A 694/2010

(51) Int. Cl.
| | |
|---|---|
| B23K 26/00 | (2014.01) |
| B23K 11/00 | (2006.01) |
| B23K 31/02 | (2006.01) |
| B23K 9/02 | (2006.01) |
| B23K 37/00 | (2006.01) |
| B23K 35/12 | (2006.01) |
| B23K 31/00 | (2006.01) |
| B23K 26/24 | (2014.01) |

(52) U.S. Cl.
CPC ...................................... B23K 26/24 (2013.01)
USPC .................... 219/121.64; 219/59.1; 219/60.2; 219/61; 219/61.13; 219/61.3; 228/47.1; 228/121; 228/164; 228/183; 228/227; 228/245; 228/248.1; 228/252

(58) Field of Classification Search
USPC ............... 219/121.63, 121.64, 59.1, 60.2, 61, 219/61.13, 61.3; 228/183, 173.1, 173.4, 228/15.1, 17.5, 227, 245, 248.1, 252, 47, 228/121
See application file for complete search history.

(56) References Cited

U.S. PATENT DOCUMENTS

| | | | | | |
|---|---|---|---|---|---|
| 2,391,252 | A | * | 12/1945 | Louthan ......................... | 219/153 |
| 2,754,572 | A | * | 7/1956 | Johnson ......................... | 228/118 |
| 2,759,246 | A | * | 8/1956 | Campbell .................. | 29/889.72 |
| 2,779,086 | A | * | 1/1957 | Rieppel et al. ........... | 29/890.042 |
| 3,062,949 | A | * | 11/1962 | Lippart et al. ................ | 219/60.2 |
| 3,246,116 | A | * | 4/1966 | Anderson et al. ............... | 219/61 |

(Continued)

FOREIGN PATENT DOCUMENTS

| | | |
|---|---|---|
| DE | 10 2005 001 435 A1 | 7/2006 |
| GB | 2 421 457 A | 6/2006 |
| WO | 2006/065195 A1 | 6/2006 |
| WO | 2006/072433 A1 | 7/2006 |

OTHER PUBLICATIONS

Austrian Office Action, mail date is Nov. 24, 2010.

*Primary Examiner* — Dana Ross
*Assistant Examiner* — Gyounghyun Bae
(74) *Attorney, Agent, or Firm* — Greenblum & Bernstein, P.L.C.

(57) ABSTRACT

A method for producing a metal sheet with a welded-on tube which has at least partially curved sections, wherein the tube is guided by at least one guide element onto the sheet, is pressed thereon with at least one pressure element and is welded thereto at least at some points and wherein the tube is bent to form the curved sections. In order to achieve the welding-on in a simple manner even in the curved sections, it is provided that a bending is carried out in a plurality of discrete steps, wherein in individual steps firstly the tube with the at least one guide element is bent around a last created welding point and thereafter a new welding point is created. Furthermore, the invention relates to a device for carrying out the method.

18 Claims, 3 Drawing Sheets

(56) References Cited

U.S. PATENT DOCUMENTS

| | | | |
|---|---|---|---|
| 3,541,296 A * | 11/1970 | Rudd | 219/117.1 |
| 3,837,956 A * | 9/1974 | Erwin | 56/218 |
| 3,954,218 A * | 5/1976 | van Dijk | 228/173.1 |
| 3,989,105 A * | 11/1976 | Trepaud | 165/158 |
| 4,053,010 A * | 10/1977 | Boccon-Gibod | 164/482 |
| 4,233,484 A * | 11/1980 | Udall | 219/67 |
| 4,554,429 A * | 11/1985 | Kazlauskas | 219/60.2 |
| 4,604,054 A * | 8/1986 | Smith | 431/328 |
| 5,883,354 A * | 3/1999 | Elofson | 219/83 |
| 5,935,475 A * | 8/1999 | Scoles et al. | 219/633 |
| 6,149,781 A * | 11/2000 | Forand | 204/239 |
| 2001/0015349 A1* | 8/2001 | Belloni et al. | 219/124.34 |
| 2003/0072675 A1* | 4/2003 | Takeda et al. | 422/22 |
| 2007/0207186 A1* | 9/2007 | Scanlon et al. | 424/424 |
| 2008/0190414 A1 | 8/2008 | Link | |
| 2009/0308566 A1* | 12/2009 | Simka | 165/45 |

\* cited by examiner

METHOD AND DEVICE FOR PRODUCING A METAL SHEET WITH A WELDED-ON PIPE

CROSS-REFERENCE TO RELATED APPLICATION

The present application claims priority under 35 U.S.C. §119 and §365 to Austrian Application No. A 694/201003 filed Apr. 27, 2010.

BACKGROUND OF THE INVENTION

1. Field of the Invention

The invention relates to a method for producing a metal sheet with a welded-on tube, which has at least partially curved sections, wherein the tube is guided by at least one guide element onto the sheet, is pressed thereon with at least one pressure element and is welded thereto at least at some points and wherein the tube is bent to form the curved sections.

Furthermore, the invention relates to a device for producing a metal sheet with a welded-on tube, which has at least partially curved sections, comprising at least one guide element, by which the tube can be guided and by which bending forces can be transferred to the tube, at least one pressure element, which is arranged adjoining the at least one guide element and presses the guided tube onto the metal sheet, and at least one welding device arranged at the side of the at least one pressure element, with which welding device, in a region of a contact line of the tube and the metal sheet, the tube can be welded on the metal sheet at least at some points under the at least one pressure element.

The above-mentioned metal sheets with welded-on tubes are generally used as heat exchangers, for example, as flat absorbers, typically in thermal solar collectors. With flat absorbers, heat is thereby transferred from the metal sheet heated by absorbed solar rays or an absorber plate to a welded-on tube and transferred from there to a liquid heat transfer medium located in the tube. For a high efficiency of the flat absorber or of heat exchangers in general, a good heat transfer is important, which depends at least in part on a quality of welded joints.

2. Discussion of Background Information

According to the prior art, methods are known for producing a metal sheet with a welded-on tube, wherein, e.g., a meandering tube is placed on a metal sheet and is welded thereto. In a first operation, the tube is bent into a desired shape, in a second operation a welding-on of the placed, pre-shaped tube on the metal sheet is carried out. In DE 10 2005 001 435 A1, a method of this type is described, which makes it possible to weld a tube curved in a meandering manner on the metal sheet even in curved sections of the tube. This method produces a good result per se, but today the trend with respect to the most efficient possible production method is towards removing the tube for welding on the metal sheet directly from a coil, without previously bending it into the desired shape in a separate operation. The method disclosed in DE 10 2005 001 435 A1 has the disadvantage that two separate operations to be performed consecutively are necessary for the bending and welding-on of the tube. In addition to a more complicated process sequence resulting therefrom which takes longer and takes up more space and is therefore inefficient, it is also disadvantageous that a continuous contact between the tube and the metal sheet cannot be achieved or can be achieved only with great difficulty.

From the prior art, as mentioned, methods are also known, wherein the tube is not arranged on the metal sheet pre-bent, but is continuously fed from a coil and bent. In a method of this type for producing a heat exchanger described in WO 2006/065195 A1, a tube is applied to a metal sheet from a coil by rolls and, in the case of a straight course of the tube, welded to the metal sheet in the same operation. In order to achieve a curved course of the tube, a welding is interrupted and the tube is bent into a desired shape by a pair of bending rolls. After the bending, the welding of the tube on the metal sheet is continued in a subsequent straight section of the tube. In the method described in WO 2006/065195 A1, although a number of the operations is reduced, the principle of the method means that a welding of the tube on the metal sheet during the bending or in the curved sections of the tube is not possible: a contact line between the tube and the metal sheet is covered by applied bending rolls in the curved sections and thus is not accessible for a welding device. The lack of welding points in the curved sections produces a poorer heat transfer between the metal sheet and the tube. Although the welding of the tube in the curved sections could be carried out in a separate, later operation, this in turn would lead to an inefficient method that would take a long time.

SUMMARY OF EMBODIMENTS OF THE INVENTION

An aim of the invention is therefore to disclose a method of the type mentioned at the outset, with which a welding of a tube on a metal sheet can be carried out in a simple manner even in curved sections of the tube.

A further aim of the invention is to disclose a device of the type mentioned at the outset, with which a welding of a tube on a metal sheet can be carried out in a simple manner even in curved sections of the tube.

The method-related aim of the invention is attained with a method of the type mentioned at the outset in that a bending is carried out in a plurality of discrete steps, wherein in individual steps firstly the tube is bent with the at least one guide element around a last created welding point and thereafter a new welding point is created. If welding points are created on both sides of the tube, a bending around last created welding points lying opposite one another is carried out.

One advantage achieved with the method according to the invention is to be seen in particular in that the welding of the tube on the metal sheet is achieved in a simple manner even in the curved sections of the tube. In particular, the welding is carried out in the same operation as the bending of the tube. Since the bending is carried out in a plurality of small discrete steps, stable welding points are achieved, around which continuously fed tube can be bent. The fed tube can be fixed then or after the bending by a further welding point before this operation is repeated. Bending and welding thus take place quasi continuously during a movement of the production device in the same operation on one or both sides of the tube. Thus a virtually continuous production of a metal sheet is achieved with a tube welded on even in its curved sections. The realization is thereby used that the tube can be bent around a created welding point without the tube being detached again in the region of the welding point or optionally welding points.

Typically, in each of the discrete steps first the tube with the at least one guide element is bent around a last created welding point and thereafter a new welding point is created.

In order not to stress already created welding points too much when bending the tube, it has proven useful to keep a bending angle as small as possible. Preferably, the bending angle per discrete step is adjusted to more than 0° to 10°, in particular 0.5° to 2.5°.

The method can be carried out particularly efficiently if the tube is guided from a coil from above onto the metal sheet. Twists of the fed tube and thus undesirable production stoppages are thus avoided. If the framework conditions permit, however, the tube can also be fed from the side.

It has furthermore proven useful to guide the tube with the aid of a guide tube onto the metal sheet. The tube can thereby be guided evenly with low tolerances and in a targeted manner to the guide element and to the pressure element.

It is particularly advantageous if at least the last created welding point is strain-relieved during bending, in particular tension-relieved and/or pressure-relieved and/or shear-relieved. The welding points are then less mechanically stressed during bending and have a better quality, which promotes good heat transfer between the metal sheet and the tube.

It has proven useful to weld the tube on the metal sheet by a laser preferably on both sides of the tube. Of course, however, other types of welding can also be used.

The further aim is attained in that with a device of the type mentioned at the outset a control unit is provided, which controls the device such that it moves in a plurality of discrete steps in the curved sections, wherein the device in individual steps first bends the tube with the at least one guide element around a last created welding point and thereafter creates a new welding point.

One advantage achieved with the invention is to be seen in particular in that it makes it possible to weld the tube on the metal sheet in a simple manner even in curved sections. It is also advantageous in particular that with a device according to the invention the welding can be carried out quasi in the same operation with the bending.

It has proven useful that at least one strain-relieving element is arranged at the side of the at least one pressure element. Through a strain-relieving element of this type at least the last created welding point is strain-relieved during bending, in particular tension-relieved and/or pressure-relieved and/or shear-relieved. Furthermore, the device is guided by the at least one strain-relieving element during the bending, so that a stable behavior in the curved sections is achieved. Moreover, with a suitable shape of the at least one strain-relieving element, a postforming of the already welded bending of the tube carried out in discrete steps can be achieved.

In order to fully utilize these advantages, it has proven useful for two strain-relieving elements to be arranged at the side of the at least one pressure element.

Preferably, at least one welding device is a laser.

It is advantageous if at least one strain-relieving element is provided, which has a cutout so that a laser light beam can be guided into the region of the contact line of the tube and of the metal sheet.

Furthermore, it is advantageous if a guide tube is arranged upstream of the at least one guide element, which guides the tube to the at least one guide element and the at least one pressure element.

BRIEF DESCRIPTION OF THE DRAWINGS

These and further features, advantages and effects of the invention are shown based on the exemplary embodiment shown below. The drawings, to which reference is thereby made, show.

DETAILED DESCRIPTION OF EMBODIMENTS OF THE INVENTION

Figure 1:
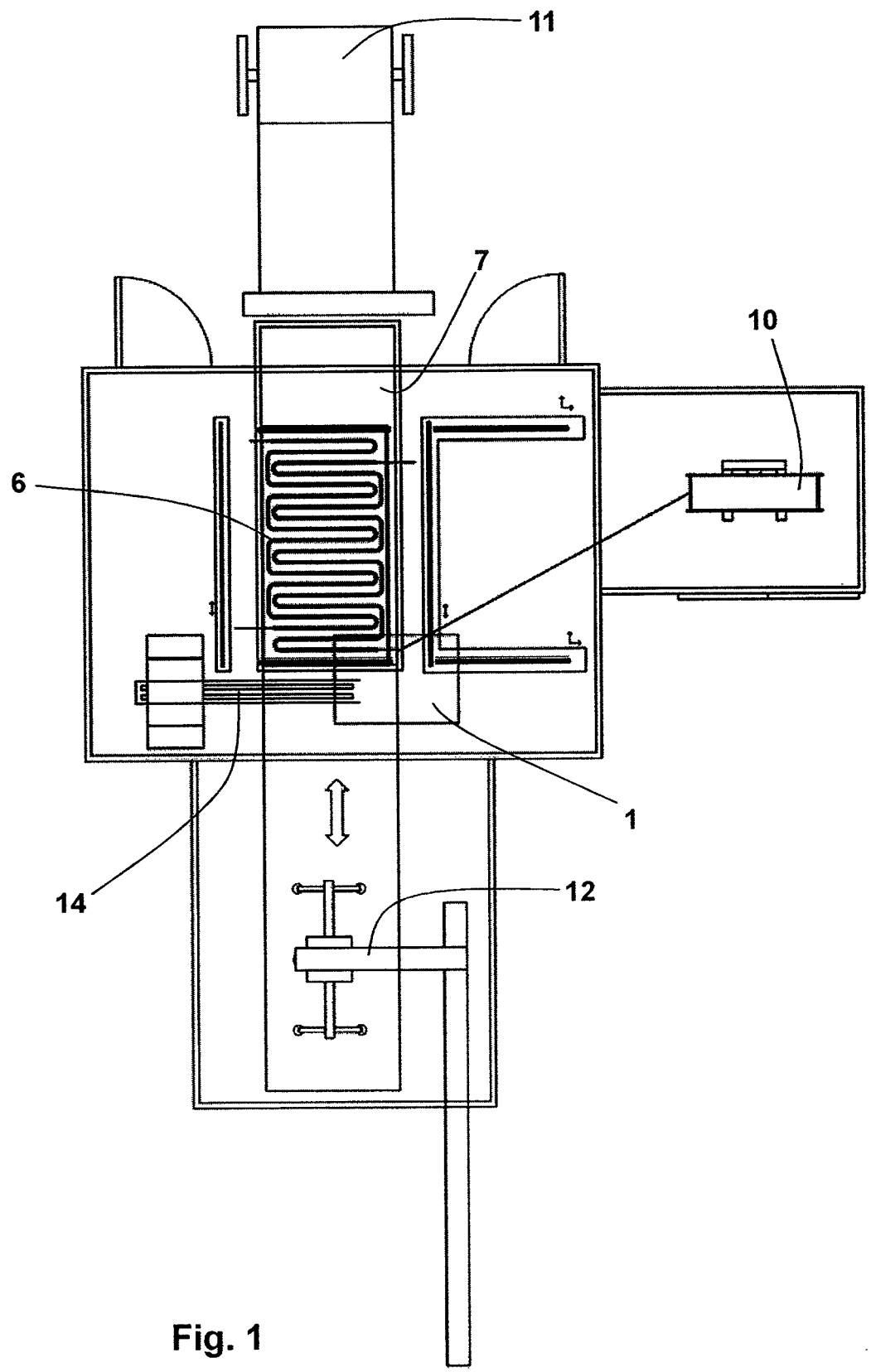
FIG. 1 A diagrammatic plan view of a system for producing flat absorbers.

The diagrammatic representation of an automatic manipulating system for producing flat absorbers in FIG. 1 shows a device 1 according to the invention for producing a metal sheet 7 with a welded-on tube 6. A (sheet metal) coil 11 is provided to feed the metal sheet 7. The metal sheet 7 is unrolled from this coil 11, cut to length and positioned and fixed under the device 1. The tube 6 is unrolled from a (tube) coil 10 and fed to the device 1. The device 1 is connected to a robot arm 14 and can be moved therewith.

Figure 2:
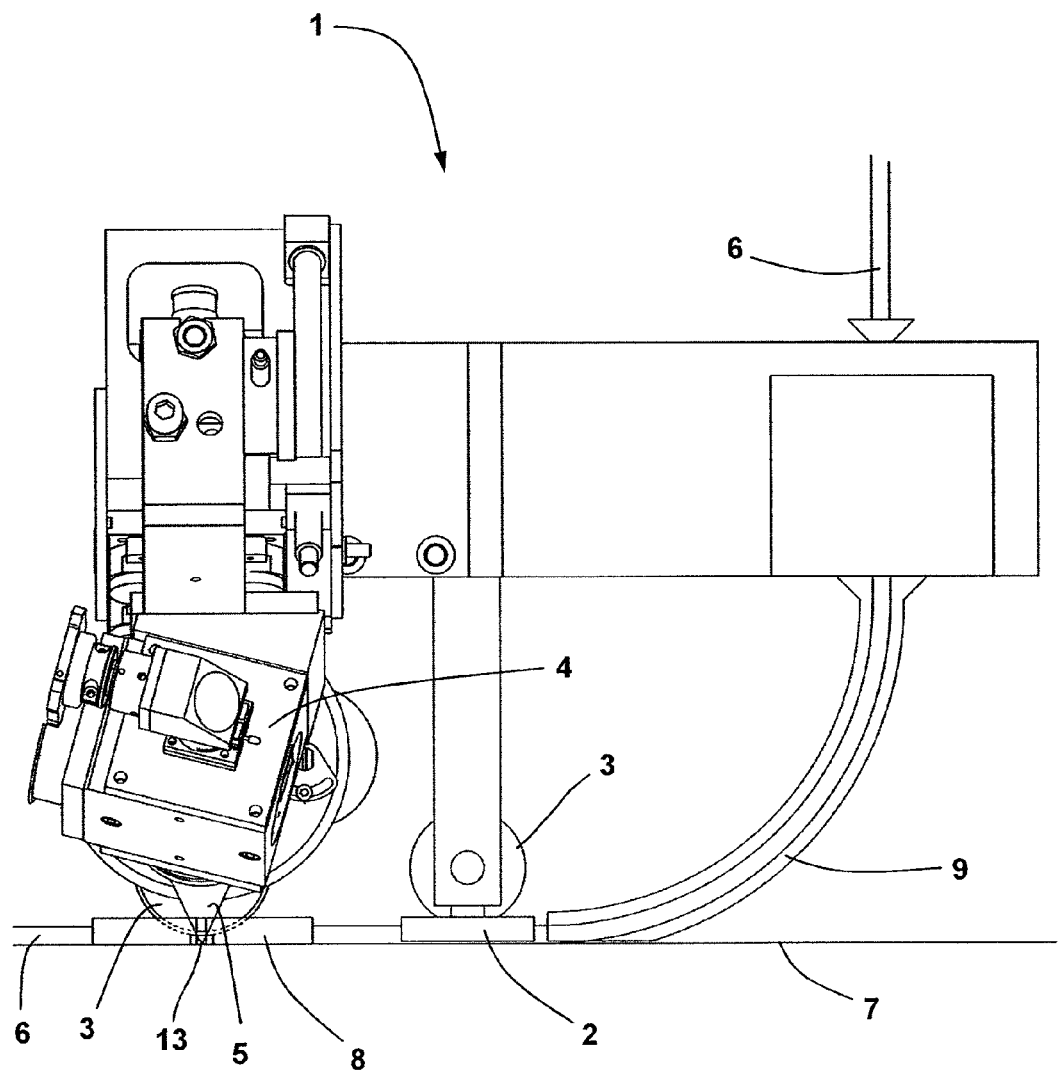
FIG. 2 A side view of a device according to the invention.

FIG. 2 shows a side view of the device 1 for producing a metal sheet 7 with a welded-on tube 6. The metal sheet 7 and the tube 6 are respectively composed of aluminum or an aluminum alloy, although other materials can also be used, for example, copper, copper alloys and/or steels. Respectively two welding devices 4, laser light beams 5, strain-relieving elements 8 and guide elements 2 thereby lie symmetrically to a plane standing on the metal sheet 7 going through the tube 6, as is shown in FIG. 3. The device 1 comprises a guide tube 9, directed upwards to the coil (not shown in FIG. 2), with which guide tube the tube 6 is guided from above onto the metal sheet 7, as well as guide elements 2, which guide the tube 6 on the metal sheet 7, furthermore pressure elements 3, which press the tube 6 on the metal sheet 7, as well as the referenced welding devices 4 on both sides of a pressure element 3. On both sides of a pressure element 3 a strain-relieving element 8 with respectively one cutout 13 is located, through which respectively one laser light beam 5 can be guided in the region of the contact line of the tube 6 and of the metal sheet 7 in order to weld the tube 6 along a plurality of welding points and/or at least one weld line on the metal sheet 7. The strain-relieving element 8 is thereby preferably arranged at the side of the last created welding point. The tube 6 is fed continuously via the guide tube 9 and the guide elements 2 to the pressure elements 3, where the welding or fixing on the metal sheet 7 is carried out by the welding devices 4.

In the production of a flat absorber, the device 1 moves in a controlled or programmed manner along a desired shape of the tube 6, wherein the tube 6 is bent and also welded in its curved sections on the metal sheet 7 in the same operation, without thereby having to interrupt the overall movement of the device 1 for a longer period.

After this operation is ended, the metal sheet 7 with the welded-on tube 6 is removed by a removal device 12 from the manipulating system, and the production of a new flat absorber can be started.

Figure 3A:
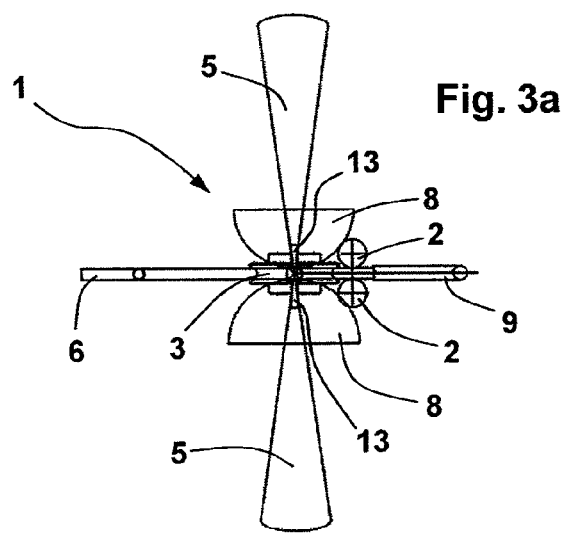
FIG. 3 A sequence of a method according to the invention for producing flat absorbers.
Figure 3D:
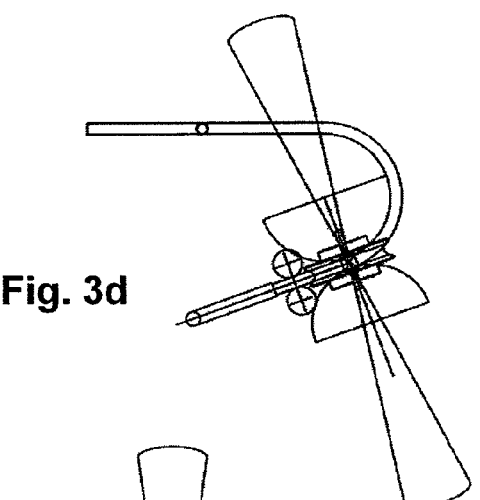
Figure 3B:
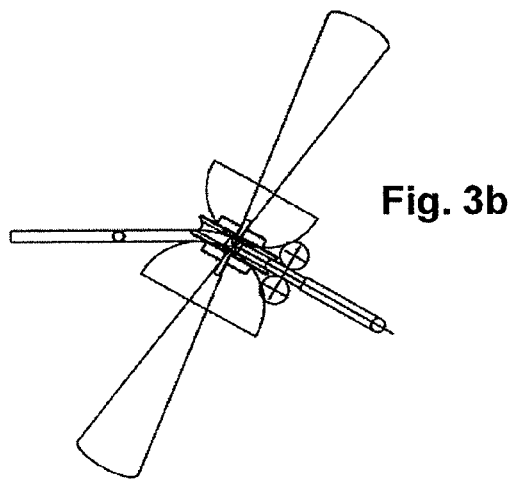
Figure 3E:
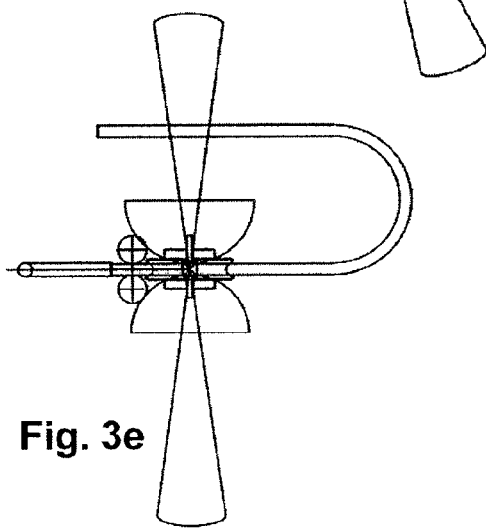
Figure 3C:
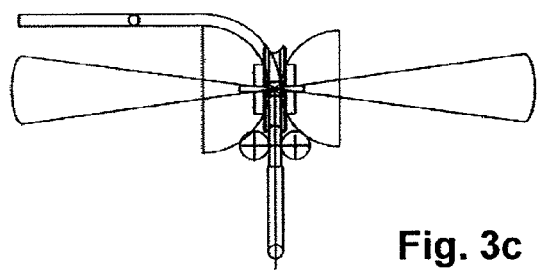

FIGS. 3a through 3e show the sequence of the production of a metal sheet 7 with a welded-on tube 6 in the region of a curved section of the tube 6 in different phases. The metal sheet 7 thereby lies in the drawing plane. In FIG. 3a the device 1 moves along the tube 6 to the right. The device 1 comprises a guide tube 9, two guide elements 2, a pressure element 3 and two strain-relieving elements 8 at the sides of the pressure element 3, which have respectively one cutout 13, through which laser light beams 5 can be guided into the region of the contact line of the tube 6 and of the metal sheet 7. In the plan view, for the sake of simplicity, the strain-relieving elements 8 have the shape of a semicircle, however, the rear quarter circle would be sufficient. The strain-relieving elements 8, however, can also have any other desired form, as long as they have a strain-relieving effect. FIGS. 3b through 3e now show the embodiment of a right curve of the tube 6 through the device 1 with simultaneous welding or fixing on both sides, i.e., on the inside and on the outside, of the tube 6 on the metal sheet 7 in the curved section. Bending and welding or fixing thereby take place during the movement of the device 1. The method therefore results in a quasi continuous production with minimized dead times.

In the preferred method variant, the bending takes place in a plurality of discrete steps, wherein in each step first the tube 6 with the guide elements 2 is bent around two welding points last created on both sides of the tube 6, and thereafter two new welding points are created. The resulting bending of the tube 6 is thereby determined by the number of the discrete steps, by the bending angle in each discrete step and by the step widths of the individual discrete steps. The strain-relieving elements 8 are thereby preferably arranged at the side of the last created welding points, i.e., these elements are arranged downstream of the pressure element 3, which is not discernible in the greatly simplified representation in FIGS. 3a through 3e, however. The strain-relieving elements 8 have three functions:

Firstly, during a rotation of the device 1 and the bending of the tube 6 associated therewith, the strain-relieving elements 8 exert a counter pressure in the region of the welding point last created. This causes a strain relief of these welding points and thus leads to a higher quality of the welding points in the curved sections of the tube 6. Secondly, the strain-relieving elements 8 according to the semicircular embodiment thereof produce an improved guidance of the device 1 along the bent tube 6. The method thus shows a more stable behavior in the curved sections of the tube 6. Thirdly, with coordination of the shape or the radius of curvature of the strain-relieving element 8 with the shape or the radius of curvature of the curved section of the tube 6, the strain-relieving elements 8 cause a postforming of the bending of the tube 6 carried out in the individual discrete steps. To this end, it is advantageous if the strain-relieving elements 8 can be easily replaced.

Overall, the described process sequence produces a quasi continuous production process as it were without a stop.

A further method variant is characterized in that the welding of the tube 6 during the bending takes place along at least one weld line. With a corresponding shape of the strain-relieving elements 8, these cause a controlled, continuous bending of the tube 6 according to their shape or their radius of curvature.

A contact pressure of one or more pressure elements 3 onto the tube 6 can be controlled in the straight sections such that the tube 6, which as a rule is made of aluminum or an aluminum alloy, is deformed in these sections, e.g., in cross section to form an ellipse or a trapezoid. A contact surface to the metal sheet 7 can thereby be enlarged and efficiency increased. In the curved sections, however, a contact pressure is reduced, since in these sections the tube 6 is to be applied in its original round form, because a shaped tube is virtually impossible to bend around a small radius.

The invention claimed is:

1. A method for producing a metal sheet with a welded-on tube having at least partially curved sections, the method comprising:
   guiding the tube by at least one guide element onto the metal sheet, such that the tube is progressively placed in contact with the metal sheet;
   pressing the tube on the metal sheet with at least one pressure element;
   welding the tube to the metal sheet at least at some points, and
   bending the tube in a plurality of discrete steps to form the curved sections,
   wherein each of the plurality of discrete steps comprises bending the tube with the at least one guide element around a last created welding point and thereafter performing the welding to create a new welding point.

2. The method according to claim 1, wherein a bending angle per discrete step is adjustable from more than 0° to 10°.

3. The method according to claim 2, wherein the bending angle per discrete step is adjustable from 0.5° to 2.5°.

4. The method according to claim 1, wherein the tube is guided from a coil from above onto the metal sheet.

5. The method according to claim 1, wherein the tube is guided with the aid of a guide tube onto the metal sheet.

6. The method according to claim 1, further comprising strain-relieving at least the last created welding point during bending.

7. The method according to claim 6, wherein the strain-relieving comprises at least one of tension-relieving, pressure-relieving and shear-relieving.

8. The method according to claim 1, wherein the tube is welded on the metal sheet by a laser.

9. The method according to claim 8, wherein the welding the tube comprises welding the tube on both sides of the tube.

10. The method of claim 1, further comprising, progressively feeding the tube from a tube supply through the at least one guide element.

11. A device for producing a metal sheet with a welded-on tube having at least partially curved sections, comprising:
    at least one guide element structured and arranged to guide the tube onto the metal sheet, such that the tube is progressively placed in contact with the metal sheet, wherein the at least one guide element is additionally structured and arranged to transfer bending forces to the tube;
    at least one pressure element, which is arranged adjoining the at least one guide element and presses the guided tube onto the metal sheet;
    at least one welding device arranged at the side of the at least one pressure element, with which welding device, in a region of a contact line of the tube and the metal sheet, the tube is weldable on the metal sheet at least at some points under the at least one pressure element; and
    a control unit configured to control the device such that the device is movable in a plurality of discrete steps in the curved sections, wherein each of the plurality of discrete steps comprises bending the tube with the at least one guide element around a last created welding point and thereafter performing a welding to create a new welding point.

12. The device according to claim 11, further comprising at least one strain-relieving element arranged at a side of the at least one pressure element.

13. The device according to claim 12, wherein the at least one strain-relieving element comprises two strain-relieving elements arranged at respective sides of the at least one pressure element.

14. The device according to claim 11, wherein the at least one welding device is a laser.

15. The device according to claim 14, further comprising at least one strain-relieving element having a cutout structured and arranged so that a laser light beam can be guided into the region of the contact line of the tube and of the metal sheet.

16. The device according to claim 14, structured and arranged to progressively receive the tube fed from a tube supply.

17. The device according to claim 11, further comprising a guide tube arranged upstream of the at least one guide element, structured and arranged to guide the tube to the at least one guide element and the at least one pressure element.

18. A device for producing a metal sheet with a welded-on tube which has at least partially curved sections, comprising at least one guide element by which the tube can be guided and by which bending forces can be transferred to the tube, at least one pressure element, which is arranged adjoining the at least one guide element and presses the guided tube onto the metal sheet, and at least one welding device arranged at the side of the at least one pressure element, with which welding device, in a region of a contact line of the tube and the metal sheet, the tube can be welded on the metal sheet at least at some points under the at least one pressure element, wherein a control unit is provided, which controls the device such that it moves in a plurality of discrete steps in the curved sections, wherein the device in individual steps first bends the tube with the at least one guide element around a last created welding point and thereafter creates a new welding point, wherein the at least one welding device is a laser, and wherein at least one strain-relieving element is provided, which has a cutout so that a laser light beam can be guided into the region of the contact line of the tube and of the metal sheet.

* * * * *